United States Patent [19]

Butler

[11] Patent Number: 4,951,461
[45] Date of Patent: Aug. 28, 1990

[54] POWER TURBINE SUPPORT ARRANGEMENT

[75] Inventor: Lawrence Butler, Cincinnati, Ohio

[73] Assignee: General Electric Company, Cincinnati, Ohio

[21] Appl. No.: 325,728

[22] Filed: Mar. 20, 1989

[51] Int. Cl.⁵ ............................................. F02K 3/072
[52] U.S. Cl. .................................. 60/39.162; 60/268; 415/65; 416/129
[58] Field of Search ................ 60/268, 39.162, 39.161; 416/129, 128; 415/65, 66, 68, 69

[56] References Cited

U.S. PATENT DOCUMENTS

| | | | |
|---|---|---|---|
| 3,524,318 | 8/1970 | Bauger et al. | 60/39.162 |
| 4,621,978 | 11/1986 | Stuart | 416/128 |
| 4,738,591 | 4/1988 | Butler | 416/129 |
| 4,758,129 | 7/1988 | Strock et al. | 415/69 |
| 4,790,133 | 12/1988 | Stuart | 60/226.1 |

Primary Examiner—Donald E. Stout
Attorney, Agent, or Firm—Jerome C. Squillaro

[57] ABSTRACT

A coupling arrangement for supporting a power turbine in a gas turbine engine. The power turbine section comprises a stator structure, first and second rotors, and first and second bearings. The first and second rotors are coaxially disposed about a longitudinal axis of the stator. An annular gas flowpath is coaxially positioned between the first and second rotors. Annular arrays of turbine blades are coupled to the first and second rotors and extend into the flowpath so that a gas stream flowing through the flowpath reacts with the turbine blades causing the rotors to counterrotate. The first bearings are interposed between the first rotor and the stator structure to rotatably secure the first rotor to the stator structure. The second bearings are interposed between the second rotor and the first rotor to rotatably secure the second rotor to the first rotor. By securing the second rotor to the first rotor both rotors maintain a common axis of rotation when the stator structure undergoes deflection along its longitudinal axis.

7 Claims, 2 Drawing Sheets

POWER TURBINE SUPPORT ARRANGEMENT

FIELD OF THE INVENTION

This invention relates generally to gas turbine engines and, more particularly, to a coupling arrangement for supporting the power turbine of an unducted fan engine on a static structure.

BACKGROUND OF THE INVENTION

Gas turbine engines such as the type used in aircraft generally include a compressor, a combustor, and a high pressure turbine in serial flow relationship. Air entering the engine is compressed by the compressor and then mixed with fuel and ignited to form a high energy gas stream. The gas stream passes through the high pressure turbine where some of the combustion energy is extracted to drive the compressor. Turboprop and turbofan engines used for aircraft propulsion also commonly include a second turbine, known as a power turbine, located downstream (aft) of the high pressure turbine. The power turbine extracts energy from the gas stream to drive a plurality of propeller or fan blades which provide the propulsive force to move an aircraft.

A recent improvement over the engines described above is the unducted fan engine such as disclosed in U.S. patent application Ser. No. 071,594 filed Jul. 10, 1987 now allowed, a continuation of U.S. patent application Ser. No. 728,466, filed May 1, 1985, now abandoned, a continuation-in-part of U.S. patent application Ser. No. 437,923—Johnson, filed Nov. 1, 1982 now abandoned. Johnson discloses a gas turbine engine in which first and second annular arrays of propulsor blades extend radially outward from the power turbine. The power turbine includes a plurality of arrays of turbine blades alternately coupled to first and second rotors such that the rotors counter-rotate when the gas stream passes through the power turbine. The first and second arrays of propulsor blades are coupled respectively to the first and second rotors to effect propulsive movement.

The Johnson patent application discloses first and second rotors coaxially positioned about a static structure wherein the first rotor is rotatably coupled to the static structure by a first set of roller-element bearings, and the second rotor is rotatably coupled to the static structure by second set of roller element bearings.

A disadvantage of supporting both rotors directly on the static structure is that axial bending of the static structure may cause turbine blades in one annular array to deflect, or, at worst, collide with counter-rotating turbine blades in an adjacent annular array. Such deflections may occur when the static structure experiences bending forces from the propulsor blades while also supporting the weight of the rotors. As an aircraft undergoes maneuvers or is subjected to external forces, the static structure is subjected to bending moments resulting in deflections of the rotor supports. If the rotational axis of the structure at the first set of bearings becomes significantly different from the rotational axis of the structure at the second set of bearings, adjacent arrays of turbine blades may have different axes of rotation and collide with each other. Because such a collision may cause serious damage to the power turbine, it is desirable to provide a power turbine for an unducted fan type engine in which the adjacent arrays of turbine blades are not subject to deflections of this type.

In aircraft employing unducted fan type engines, the engine mounts coupling the engines to the aircraft are attached to each engine forward of the power turbine section in order to avoid interferences with the propulsor blades. Part of the static structure is suspended rearward of the engine mounts centrally through the power turbine section in order to support the rotors of that section. A disadvantage of supporting each rotor directly on the static structure is that the static structure must be of an extended length in order to separately support each rotor. In order to provide a relatively rigid, non-deflecting support for this lengthy suspended configuration the overall size and mass of the stator must be relatively large. The corresponding weight increase directly affects aircraft fuel efficiency. If the rotors could be supported in a manner which would permit the length of the static structure to be reduced, the weight of the engine could also be reduced and the fuel efficiency of the aircraft further increased.

SUMMARY OF THE INVENTION

It is an object of the present invention to provide an improved power turbine for an unducted fan gas turbine engine which overcomes the above discussed disadvantages.

It is another object of the present invention to provide a power turbine section for an unducted fan gas turbine engine in which the rotor support structure has a reduced length.

It is still another object of the present invention to provide a power turbine for an unducted fan gas turbine engine in which only a forward portion of a rotor is coupled to a stator thereby permitting a reduction in the mass of the stator.

It is still another object of the present invention to provide a reduced length static rotor support structure which permits deflection of the support structure while preventing differential deflection between engine rotors.

In an illustrative embodiment, the present invention is incorporated in the power turbine section of a gas turbine engine comprising a stator, first and second rotors, and first and second bearing means. The first and second rotors are coaxially positioned about a longitudinal axis of the stator. An annular gas flowpath is disposed about the longitudinal axis between the first and second rotors. Each rotor is coupled to a plurality of annular arrays of turbine blades arranged circumferentially about the rotor and extending into the gas flowpath such that gas flow through the flowpath causes each of the rotors to rotate. Each array of turbine blades attached to the first rotor is coaxial with and adjacent to an array of turbine blades attached to the second rotor forming alternating interdigitated annular arrays of blades for each rotor. First bearing means are interposed between the first rotor and the stator to rotatably secure the first rotor to the stator. Second bearing means are interposed between the first and second rotors to rotatably secure the second rotor to the first rotor. Since the second rotor is secured to the first rotor, both rotors maintain a substantially common axis of rotation notwithstanding any stator deflections with respect to the longitudinal axis.

In accordance with a preferred embodiment of the present invention, a major portion of both the first and second rotors lies along the longitudinal axis aft of the first bearing means. Thus, the rotors are supported in a cantilever fashion aft of the first bearing means. Since the portion of the stator extending aft of the first bearing means is not load supporting, its strength and corresponding length and mass need not be as great as the portion of the stator forward of the first bearing means. This allows a reduction in weight and improves fuel efficiency.

BRIEF DESCRIPTION OF THE DRAWINGS

For a better understanding of the present invention, reference may be made to the following detailed description in conjunction with the accompanying drawings.

DETAILED DESCRIPTION OF THE INVENTION

Figure 1:
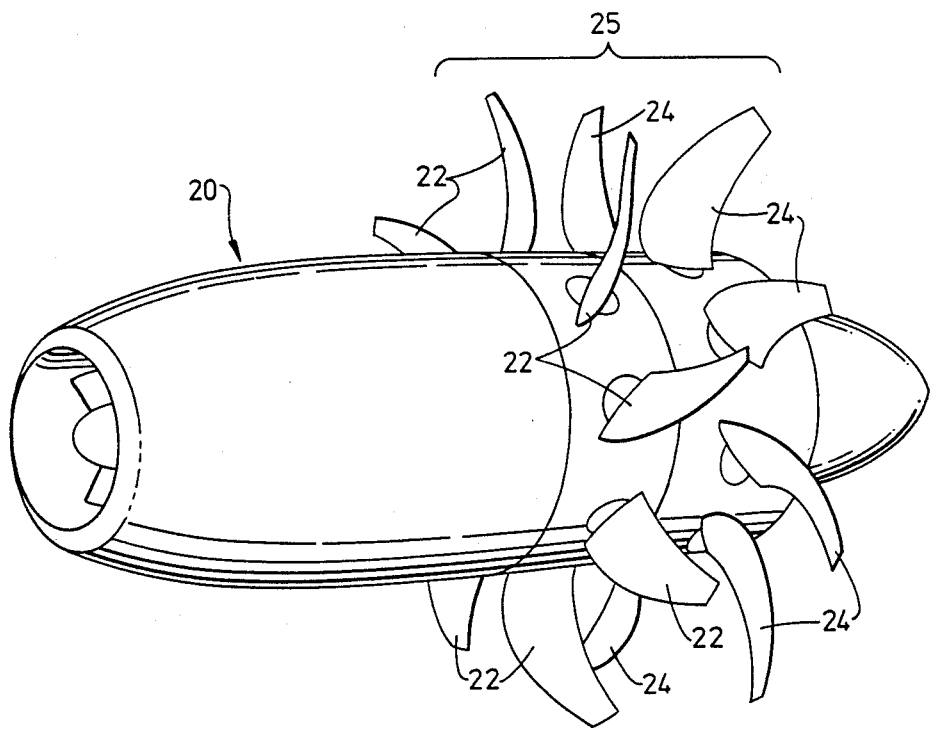
FIG. 1 is a perspective view of an unducted fan type gas-turbine engine.
Figure 2:
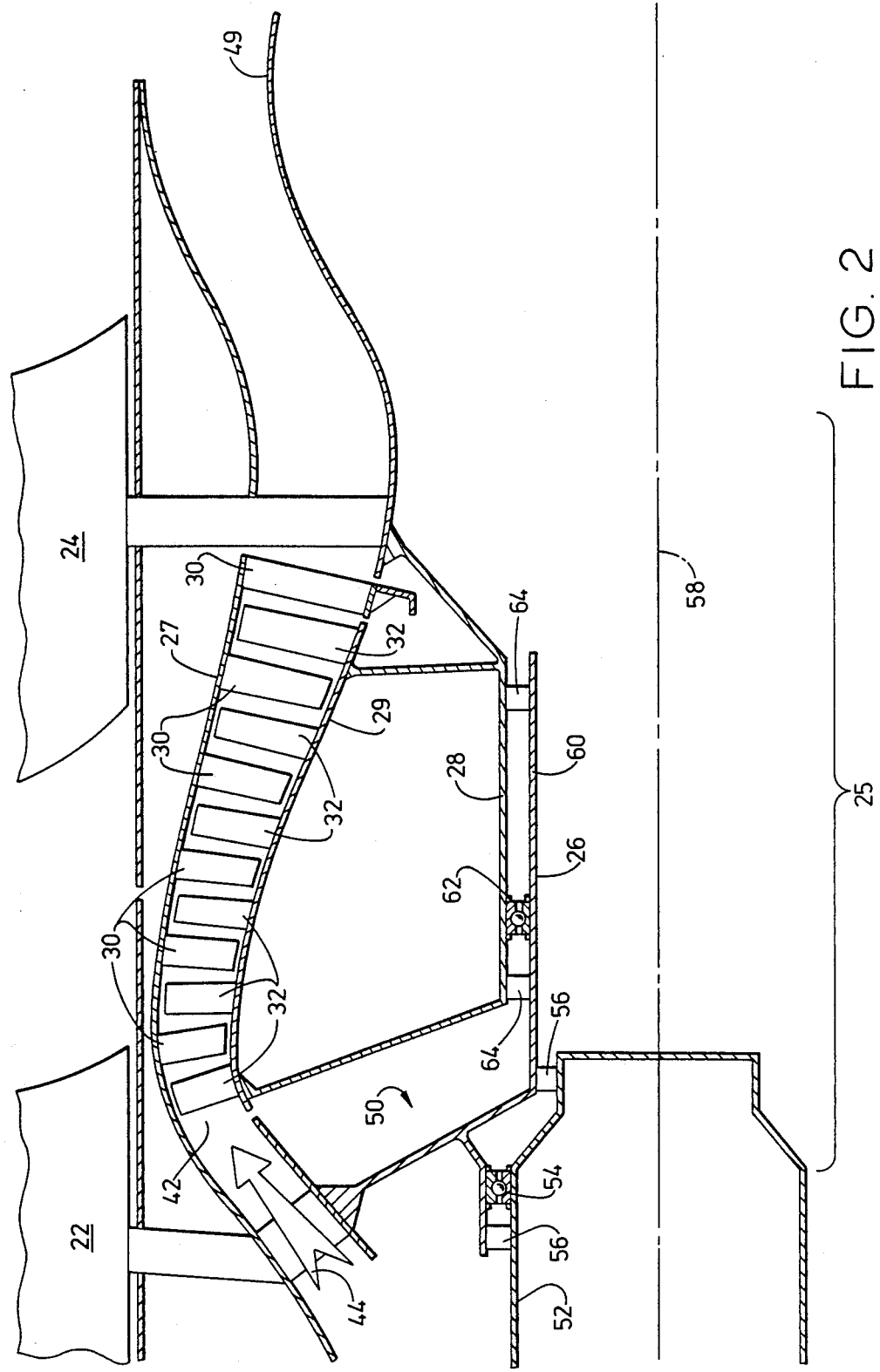
FIG. 2 is a side elevation view, in cross-section, of a portion of the power turbine section in an unducted fan type gas-turbine engine constructed in accordance with the present invention.

FIGS. 1 and 2 illustrate an unducted fan jet engine 20 arranged substantially concentrically about a central longitudinal engine axis 58. The engine includes forward and aft counterrotating fan or propulsor blades 22 and 24 disposed radially outward from a power turbine section 25. The power turbine section 25 includes first and second counterrotating rotors 26 and 28 each coupled to a plurality of annular arrays of counterrotating turbine blades 30 and 32. Forward and aft fan blades 22 and 24 are coupled to the first and second rotors 26 and 28, respectively, and rotate therewith.

The counterrotating turbine blades 30 and 32 lie in an annular gas flowpath 42 defined by the first and second rotors 26 and 28. Air passing through the engine 20 is compressed and heated to form a high energy (high pressure/high temperature) gas stream indicated generally by arrow 44. Gas stream 44 expands through the flowpath 42 reacting against the blades 30 and 32 to rotate the rotors 26 and 28 which in turn drive the counterrotating fan blades 22 and 24, respectively. A cone 49 located aft of and secured to the second rotor 28 provides the proper air flow characteristics of the gas stream 44 as it exits the engine 20.

The rotor 26 includes a forward structural support portion 50 concentrically positioned about an aft portion of a central static structure 52. The forward portion 50 is rotatably secured to the static structure 52 by way of rolling element type bearings including an annular thrust bearing 54 and two annular roller bearings 56 interposed between the static structure 52 and the forward portion 50. First rotor 26 is adjacent static structure 52, aligned along longitudinal axis 58 and the second rotor 28 is concentrically positioned about the first rotor 26. The second rotor 28 is rotatably secured to an aft portion 60 of the first rotor 26 by way of another annular thrust bearing 62 and two annular roller bearings 64 interposed between the rotors. The entire weight of the power turbine section 25 is supported by the static structure 52 through the bearings 54 and 56. Propulsive thrust from the power turbine section 25 is transferred to the static structure 52 through the forward most thrust bearing 54. It is noted that the reaction of gyro-moments of the two counterrotating rotors is reacted internally, i.e., due to the counter rotation, the positive moment of the forward rotor is reacted by the negative moment of the aft rotor through the bearings that connect the two. Therefore, there is practically zero net gyro moment transferred through the engine mounts to the air frame thus allowing lighter and softer mounts to be used.

During steady state operation, i.e., when motion of the engine 20 is parallel to axis 58, blades 22 and 24 rotate concentrically about the engine axis 58. The angular momentum of the rotating rotors 26 and 28, turbine blades 30 and 32 and fan blades 22 and 24 provide a gyroscopic moment in opposition to any torque which is applied to change the axis of rotation. If an aircraft powered by the engine 20 suddenly varies its direction, i.e., turns, climbs, or descends, or is subjected to other external forces, the static structure 52 will exert a torque against the rotors 26 and 28 tending to displace the axis of rotation of each rotor with respect to the axis 58 of static structure 52. Such a torque will cause the engine 20 to experience a bending moment transverse to the axis 58. Since the entire power turbine section 25 is coupled to the static structure 52 through the bearings 54 and 56, the rotors may deflect with respect to the structure 52. However, because the second rotor 28 is supported concentrically about the first rotor 26, rotors 26 and 28 deflect together in a manner which maintains their concentric rotation with respect to one another. As a result, collision of the turbine blades 30 and 32 is avoided. By supporting the second rotor 28 on the first rotor 26, differential deflection is avoided and the possibility of turbine blade collisions is minimized.

A further advantage of rotatably coupling the second rotor 28 to the first rotor 26 is that the rotor 32 need not be coupled directly to the static structure 52 for support purposes. If the stator structure 52 were extended rearward to support the second rotor 28, its size and mass would have to be increased along the axis 58 in order to support the second rotor 28 and withstand bending moments. However, the stator structure 52 may nevertheless be extended to or beyond the aft portion 60 of rotor 26 for nonstructural reasons such as the housing of control lines which communicate with the aft portion of the engine. Such an extended housing structure need not be as strong or massive as would be necessary for the direct support of a second rotor. By supporting the entire power turbine 25 at a forward position of the turbine in the aforedescribed manner the overall weight of the engine 20 may be reduced.

While the principles of the invention have now been made clear in an illustrative embodiment, many modifications in structure, arrangement, and components used in the practice of the invention will become apparent to those skilled in the art without departing from the principles set forth herein. Accordingly, it is intended that the above description be regarded as illustrative and that the scope of the invention be limited only by the claims which follow.

What is claimed is:

1. A power turbine section in a gas turbine engine comprising:
    a stationary static structure centered about a longitudinal axis;
    an outer rotor and an inner rotor concentrically positioned about one another along the longitudinal axis and defining an annular flowpath between said outer and inner rotors for passing a high energy gas stream through the engine;
    a first annular array of turbine blades coupled to said inner rotor and extending into said flowpath for transforming energy of the gas stream into movement of said inner rotor;

a second annular array of turbine blades coupled to said outer rotor and extending into said flowpath for transforming energy of the gas stream into movement of said outer rotor, said second annular array of turbine blades being aligned coaxially with and adjacent to said first annular array of turbine blades;

first bearing means disposed at one axial end of said inner rotor for rotatably securing said inner rotor to said static structure; and second bearing means disposed between said inner rotor and said outer rotor for rotatably securing said outer rotor concentrically about said inner rotor with a common axis of rotation decoupled from said static structure.

2. The power turbine section of claim 1 wherein said inner rotor comprises a forward structural support concentrically positioned about said static structure, said first bearing means comprising;

a first annular thrust bearing interposed between the stator structure and the forward structural support of the inner rotor;

at least a first annular roller bearing interposed between the stator structure and the forward structural support;

said second bearing means comprising:

a second annular thrust bearing interposed between said inner and outer rotors; and at least a second annular roller bearing interposed between said first and second annular thrust bearings.

3. The power turbine section of claim 1 wherein a portion of said inner rotor and a portion of said outer rotor extend longitudinally aft of said first bearing means and are cantilevered aft of said first bearing means.

4. The power turbine section of claim 2 further comprising third and fourth annular arrays of turbine blades coupled to said inner and outer rotors respectively and extending into said flowpath, said third and fourth arrays of turbine blades being disposed longitudinally aft of said first bearing means.

5. A power turbine section in a gas turbine engine comprising:

a stationary static structure;

a first rotor coaxial with said stationary static structure;

an annular gas flowpath adjacent to and coaxial with said rotor for passing a high energy gas stream through the engine;

a plurality of annular arrays of turbine blades coupled to said rotor and extending into said flowpath for transforming energy of the gas stream into rotor movement;

bearing means for rotatably securing a forward portion of said rotor to said static structure and cantilevering an aft portion of said rotor aft of said bearing means, at least one array of turbine blades positioned aft of said bearing means; and a second rotor coaxially mounted upon said first rotor and supported thereon for rotation opposite to rotation of said first rotor.

6. A power turbine section for a gas turbine engine having first and second counterrotating coaxial rotors supported for rotation about a static structure centered about a longitudinal axis, comprising;

first bearing means for rotatably securing the first rotor to the static structure; and second bearing means for rotatably securing the second rotor only about the first rotor with a common axis of rotation when the static structure is deflected along the longitudinal axis.

7. The power turbine section of claim 7 wherein the first rotor includes a forward structural support concentrically positioned about the static structure, said first bearing means comprising:

a first annular array thrust bearing interposed between the static structure and the forward structural support of the first rotor;

at least a first annular roller bearing interposed between the static structure and the forward structural support adjacent said first annular thrust bearing;

said second bearing means comprising:

a second annular thrust bearing interposed between the first and second counterrotating rotors; and at least a second annular roller bearing interposed between the first and second counterrotating rotors adjacent said second annular thrust bearing.

* * * * *